United States Patent [19]

Toyosawa et al.

[11] Patent Number: 5,716,997
[45] Date of Patent: Feb. 10, 1998

[54] POLYMERIC RETICULATED STRUCTURE AND METHOD FOR MAKING

[75] Inventors: Shinichi Toyosawa, Tokorozawa; Naruhiko Mashita, Kodaira; Yasushi Imai, Kodaira; Takahiro Matsuse, Kodaira; Yuichiro Wakana, Kodaira; Yoshihide Fukahori, Hachioji, all of Japan

[73] Assignee: Bridgestone Corporation, Tokyo, Japan

[21] Appl. No.: 522,095

[22] Filed: Aug. 31, 1995

[30] Foreign Application Priority Data

| Sep. 1, 1994 | [JP] | Japan | 6-232320 |
| Sep. 1, 1994 | [JP] | Japan | 6-232321 |
| Sep. 1, 1994 | [JP] | Japan | 6-232322 |
| Sep. 7, 1994 | [JP] | Japan | 6-239614 |
| Sep. 7, 1994 | [JP] | Japan | 6-239615 |
| Sep. 7, 1994 | [JP] | Japan | 6-239616 |

[51] Int. Cl.$^6$ ............................................. C08J 9/38
[52] U.S. Cl. ............................. 521/52; 521/61; 521/63; 521/64
[58] Field of Search ..................... 521/52, 61, 63, 521/64

[56] References Cited

U.S. PATENT DOCUMENTS 5,451,454  9/1995  Fukahori et al. .................... 521/52

FOREIGN PATENT DOCUMENTS

| A-2 316 279 | 6/1976 | France . |
| A-25 23 740 | 12/1975 | Germany . |
| A-2737745 | 3/1978 | Germany . |
| A-42 43 055 | 7/1993 | Germany . |
| 1 527 385 | 10/1978 | United Kingdom . |
| 1 576 228 | 10/1980 | United Kingdom . |

*Primary Examiner*—Morton Foelak
*Attorney, Agent, or Firm*—Sughrue, Mion, Zinn, Macpeak & Seas, PLLC

[57] ABSTRACT

A polymeric reticulated structure is prepared by mixing an ethylene-propylene copolymer having an ethylene content of at least 60% by weight or a thermoplastic block copolymer terminated with a crystalline ethylene block with a low molecular weight material. The low molecular weight material is trapped in the three-dimensional continuous network the copolymer forms.

15 Claims, 1 Drawing Sheet

POLYMERIC RETICULATED STRUCTURE AND METHOD FOR MAKING

BACKGROUND OF THE INVENTION

1. Field of the Invention

This invention relates to a polymeric reticulated structure in which an ethylene-propylene copolymer or a thermoplastic block copolymer terminated with a crystalline ethylene block forms a three-dimensional continuous network and a method for preparing the same.

2. Prior Art

As is well known in the art, ordinary porous materials, typically polyurethane foams, plastic foams and sponges are prepared by various techniques for expanding a fluid, for example, by creating cells through reaction, adding blowing agents, bubbling nitrogen gas or carbon dioxide gas, or mechanical agitation. These foaming methods are simple as such although relatively large cells are often created and grown. It is rather difficult to create micro-cells.

There are known a variety of functional separation membranes. Non-woven fabric is a typical example. Some membranes like Goretex® are prepared by stretching. Some membranes are prepared by physical perforating techniques such as etching. It is also possible to prepare separation membranes by mixing a base material with a soluble material and dissolving out the soluble material. These techniques result in relatively microporous structures although they suffer from the disadvantages of poor cell uniformity and low porosity.

As disclosed in Japanese Patent Application Kokai (JP-A) No. 239256/1993, there were recently developed polymer blends of a high molecular weight organic material having a three-dimensional reticulated or continuous network structure and a low molecular weight material. By removing the low molecular weight material from the polymer blend with an organic solvent, a three-dimensional continuous network is left. The three-dimensional continuous network shown in Example of JP-A 239256/1993 is formed of a two block copolymer of polyethylene and an ethylene-styrene random copolymer.

There is a demand for a microporous body having a microscopic three-dimensional continuous network with uniform cells and hence, exhibiting satisfactory heat resistance, chemical resistance, and physical properties as well as sufficient elasticity because such a microporous body will find a wider variety of applications.

SUMMARY OF THE INVENTION

An object of the present invention is to provide a polymeric reticulated structure which has a microscopic three-dimensional continuous network with uniform cells and hence, exhibits improved properties including low elasticity, high heat resistance, and high chemical resistance, and will thus find a wider variety of applications. Another object is to provide a method for preparing the same.

We have found that by mixing a copolymer consisting essentially of ethylene and propylene and having an ethylene content of at least 60% by weight with a low molecular weight material such that the resulting mixture contains up to 30% by weight of the copolymer, there is obtained a polymeric reticulated structure having the three-dimensional continuous network the copolymer forms. This polymeric reticulated structure has a very dense distribution of uniform cells and rubbery elasticity, is capable of effectively trapping a variety of low molecular weight materials and will find a wider variety of applications.

Similarly we have found that by mixing a thermoplastic block copolymer terminated with a crystalline ethylene block, preferably a thermoplastic block copolymer having a crystalline ethylene block attached to one end or both ends of an amorphous polymer section of an amorphous ethylene-butylene copolymer, especially containing 5 to 70% by weight of the crystalline ethylene block which has a melting point of at least 40° C., with a low molecular weight material such that the resulting mixture contains 5 to 30% by weight of the thermoplastic block copolymer, there is obtained a polymeric reticulated structure wherein the low molecular weight material is trapped in the three-dimensional continuous network the thermoplastic block copolymer forms. This polymeric reticulated structure has a very dense distribution of uniform cells, is capable of effectively trapping a variety of low molecular weight materials and will find a wider variety of applications.

Accordingly, in a first aspect, the present invention provides a polymeric reticulated structure (A-1) which is prepared by mixing a copolymer consisting essentially of ethylene and propylene and having an ethylene content of at least 60% by weight with a low molecular weight material. The low molecular weight material is trapped in the three-dimensional continuous network the copolymer forms. The present invention also provides a method for preparing a polymeric reticulated structure (A-1), comprising the step of mixing a copolymer consisting essentially of ethylene and propylene and having an ethylene content of at least 60% by weight with a low molecular weight material such that the resulting mixture contains up to 30% by weight of the copolymer.

In a second aspect, the present invention provides a polymeric reticulated structure (B-1) which is prepared by mixing a thermoplastic block copolymer having a crystalline ethylene block at one end or both ends with a low molecular weight material. The low molecular weight material is trapped in the three-dimensional continuous network the block copolymer forms. The present invention also provides a method for preparing a polymeric reticulated structure (B-1), comprising the step of mixing a thermoplastic block copolymer having a crystalline ethylene block at one end or both ends with a low molecular weight material such that the resulting mixture contains 5 to 30% by weight of the thermoplastic block copolymer.

We have also found that by removing the low molecular weight material from the polymeric reticulated structure (A-1) or (B-1), there is obtained a three-dimensional continuous network structure formed of a copolymer consisting essentially of ethylene and propylene and having an ethylene content of at least 60% by weight or a thermoplastic block copolymer having a crystalline ethylene block at one end or both ends. This three-dimensional continuous network structure has a distribution of uniform microscopic cells and rubbery elasticity, chemical resistance, and heat resistance, and will find a wider variety of applications.

Accordingly, the present invention provides a polymeric reticulated structure or microporous body (A-2) which is prepared by mixing a copolymer consisting essentially of ethylene and propylene and having an ethylene content of at least 60% by weight with a low molecular weight material and removing the low molecular weight material from the mixture. The structure has a three-dimensional continuous network composed of strands and cells, the strands having an average diameter of up to 8 µm and the cells having an average diameter of up to 80 µm. The present invention also provides a method for preparing a polymeric reticulated structure or microporous body (A-2), comprising the steps of: mixing a copolymer consisting essentially of ethylene and propylene and having an ethylene content of at least 60% by weight with a low molecular weight material such that the resulting mixture contains up to 30% by weight of the copolymer, thereby forming a reticulated structure wherein the copolymer forms a three-dimensional continuous network in which the low molecular weight material is trapped; and removing the low molecular weight material from the reticulated structure.

Also the present invention provides a polymeric reticulated structure or microporous body (B-2) which is prepared by mixing a thermoplastic block copolymer having a crystalline ethylene block at one end or both ends with a low molecular weight material and removing the low molecular weight material from the mixture. The structure has a three-dimensional continuous network composed of strands and cells, the strands having an average diameter of up to 10 μm and the cells having an average diameter of up to 80 μm. The present invention also provides a method for preparing a polymeric reticulated structure or microporous body (B-2), comprising the steps of: mixing a thermoplastic block copolymer having a crystalline ethylene block at one end or both ends with a low molecular weight material such that the resulting mixture contains 5 to 30% by weight of the thermoplastic block copolymer, thereby forming a reticulated structure wherein the copolymer forms a three-dimensional continuous network in which the low molecular weight material is trapped, and removing the low molecular weight material from the reticulated structure.

We have further found that by infiltrating a normally liquid or solid functional material into voids of the microporous body (A-2) or (B-2) from which the low molecular weight material has been removed, there is obtained a microcellular composite wherein a microporous body formed of a copolymer consisting essentially of ethylene and propylene and having an ethylene content of at least 60% by weight and having a three-dimensional continuous network having an average strand diameter of up to 8 μm and an average cell diameter of up to 80 μm or a thermoplastic block copolymer having a crystalline ethylene block at one end or both ends and having a three-dimensional continuous network having an average strand diameter of up to 10 μm and an average cell diameter of up to 80 μm is filled with the normally liquid or solid functional material. This three-dimensional continuous network has a very dense distribution of uniform cells and is capable of effectively retaining the functional material infiltrated therein, or has improved timed release. If the functional material is selected from a wide variety of materials including ink, pharmaceutical agents and fragrant components, the composite has satisfactory sustained release as printing members, pharmaceutical external preparations or fragrant preparations.

Accordingly, the present invention provides a polymeric reticulated structure or filled microcellular composite (A-3) which is prepared by a method comprising the steps of: mixing a copolymer consisting essentially of ethylene and propylene and having an ethylene content of at least 60% by weight with a low molecular weight material; removing the low molecular weight material from the mixture, thereby forming a microporous body having a three-dimensional continuous network composed of strands and cells, the strands having an average diameter of up to 8 μm and the cells having an average diameter of up to 80 μm; and incorporating a functional material which is liquid or solid at room temperature into the microporous body. The present invention further provides a method for preparing a poly-meric reticulated structure or filled microcellular composite (A-3), comprising the steps of: mixing a copolymer consisting essentially of ethylene and propylene and having an ethylene content of at least 60% by weight with a low molecular weight material such that the resulting mixture contains up to 30% by weight of the copolymer, thereby forming a reticulated structure wherein the copolymer forms a three-dimensional continuous network in which the low molecular weight material is trapped; removing the low molecular weight material from the reticulated structure to leave voids; and infiltrating a functional material which is liquid or solid at room temperature into the voids.

Also the present invention provides a polymeric reticulated structure or filled microcellular composite (B-3), which is prepared by a method comprising the steps of: mixing a thermoplastic block copolymer having a crystalline ethylene block at one end or both ends with a low molecular weight material; removing the low molecular weight material from the mixture, thereby forming a microporous body having a three-dimensional continuous network composed of strands and cells, the strands having an average diameter of up to 10 μm and the cells having an average diameter of up to 80 μm; and incorporating a functional material which is liquid or solid at room temperature into the microporous body. The present invention further provides a method for preparing a polymeric reticulated structure or filled microcellular composite (B-3), comprising the steps of: mixing a thermoplastic block copolymer having a crystalline ethylene block at one end or both ends with a low molecular weight material such that the resulting mixture contains 5 to 30% by weight of the copolymer, thereby forming a reticulated structure wherein the copolymer forms a three-dimensional continuous network in which the low molecular weight material is trapped; removing the low molecular weight material from the reticulated structure to leave voids; and infiltrating a functional material which is liquid or solid at room temperature into the voids.

BRIEF DESCRIPTION OF THE DRAWINGS

The only figure, FIG. 1 schematically illustrates a cell of a reticulated structure according to the invention.

BEST MODE FOR CARRYING OUT THE INVENTION

Polymeric Reticulated Structure (A-1)

Figure 1:
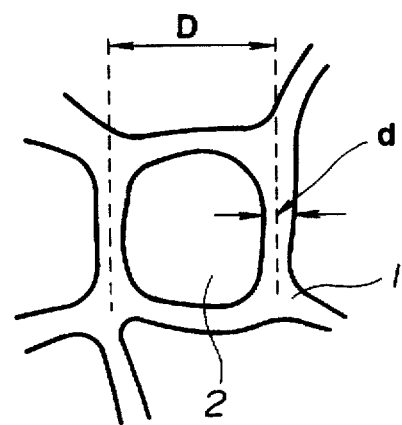

A first embodiment of the invention relates to a polymeric reticulated structure wherein a three-dimensional continuous reticulated skeleton or network having internal open cells is constructed by an ethylene-propylene copolymer.

The copolymer is an ethylene-propylene rubber (EPR) consisting essentially of ethylene and propylene and having an ethylene content of at least 60% by weight. With an ethylene content of less than 60% by weight, the polymeric reticulated structure has poor physical properties. The preferred ethylene content is 65% to 95% by weight, more preferably 70% to 90% by weight. The three-dimensional continuous network preferably possesses both a hard block section including a crystalline structure and agglomerated structure and a soft block section including an amorphous structure. Then the EPR preferably has a crystallinity of at least 3%, more preferably 5 to 60%, most preferably 8 to 50%. The melting point (Tm) of a polyethylene section representing a block parameter of ethylene is preferably at least 25° C., more preferably at least 30° C., most preferably at least 35° C. as measured by differential scanning calorimetry (DSC). The copolymer generally has a number average molecular weight of at least 20,000, preferably at least 30,000, more preferably at least 40,000.

In addition to ethylene and propylene, the copolymer may contain another copolymerizable component if desired. The copolymerizable components include, for example, 1,5-hexadiene, 1,4-hexadiene, dicyclopentadiene, and ethylidenenorbornene. For example, such a third component is blended with ethylene and propylene to form an ethylene-propylenediene terpolymer (EPDM). The third component, if used, is preferably contained in an amount of about 1 to 15% by weight, more preferably 2 to 10% by weight of the entire copolymer.

It is useful in some applications that the three-dimensional continuous network according to the invention is modified to alter its properties by introducing a hydrophilic group such as hydroxyl or a lipophilic group such as nitro into the EPR or EPDM.

The three-dimensional continuous network constructed by the copolymer has a microscopic structure as shown in FIG. 1. The three-dimensional continuous network has strands 1 of the copolymer connected to define internal cells 2 which communicate with each other. A low molecular weight material to be described later is trapped in the internal open cells 2. The strands 1 have an average diameter d of up to 8 µm, preferably 0.5 to 5 µm and the cells 2 have an average diameter D of up to 80 µm, preferably 1 to 50 µm. The porosity is desirably at least 40%, especially 50 to 95%.

The low molecular weight material which is trapped or retained in the internal open cells 2 may be selected from various materials which are either solid or liquid, depending on a particular application. The low molecular weight material which is organic preferably has a number average molecular weight of less than 20,000, more preferably up to 10,000, most preferably up to 5,000. Illustrative, non-limiting examples of the low molecular weight material are given below.

(1) Softeners: Included are mineral oils, vegetable oils and synthetic softeners for use in rubbers and resins. Exemplary mineral oils are aromatic, naphthenic, and paraffinic process oils. Exemplary vegetable oils are castor oil, cottonseed oil, linseed oil, rape oil, soybean oil, palm oil, coconut oil, peanut oil, haze tallow, pine oil, and olive oil.

(2) Plasticizer: Included are ester plasticizers such as phthalates, phthalic mixed esters, aliphatic dibasic acid esters, glycol esters, fatty acid esters, phosphates, and stearates; epoxy plasticizers; other plasticizers for plastics; and plasticizers for NBR such as phthalates, adipates, sebacates, phosphates, polyethers, and polyesters.

(3) Tackifier: Tackifiers include coumarone resins, coumarone-indene resins, phenol terpene resins, petroleum hydrocarbons, and rosin derivatives.

(4) Oligomer: Oligomers include crown ether, fluorinated oligomers, polyisobutylene, xylene resin, chlorinated rubber, polyethylene wax, petroleum resin, rosin ester rubber, polyalkylene glycol diacrylates, liquid rubbers (e.g., polybutadiene, styrene-butadiene rubber, butadiene-acrylonitrile rubber, and polychloroprene), silicone oligomers, and poly-α-olefins.

(5) Lubricant: Included are hydrocarbon lubricants such as paraffin and wax; fatty acid lubricants such as higher fatty acids and oxyfatty acids; fatty acid amide lubricants such as fatty acid amides and alkylene bisfatty acid amides; ester lubricants such as fatty acid lower alcohol esters, fatty acid polyhydric alcohol esters and fatty acid polyglycol esters; alcohol lubricants such as aliphatic alcohols, polyhydric alcohols, polyglycols, and polyglycerols; metal soaps; and mixtures.

Other useful low molecular weight materials are latex, emulsion, liquid crystal, bitumen, clay, natural starch, saccharides, inorganic silicone oil, and phosphazenes. Also included are animal oils such as beef tallow, lard, horse tallow, chicken oil, and fish oil; honey, fruit juice, chocolate, dairy products such as yogurt; organic solvents such as hydrocarbon, halogenated hydrocarbon, alcohol, phenol, ether, acetal, ketone, fatty acid, ester, nitrogen compound and sulfur compound solvents; various pharmaceutical components, soil modifiers, fertilizers, petroleum, water, and aqueous solutions. These materials may be used alone or in admixture.

If desired, fillers may be further blended according to the invention. Exemplary fillers include flake inorganic fillers such as clay, diatomaceous earth, carbon black, silica, talc, barium sulfate, calcium carbonate, magnesium carbonate, metal oxides, mica, graphite, and aluminum hydroxide; granular or powder solid fillers such as metal powder, wood chips, glass powder, and ceramic powder; and natural and synthetic short and long fibers (e.g., straw, wool, glass fibers, metal fibers, and polymer fibers).

The polymeric reticulated structure (A-1) of the invention has the low molecular weight material trapped in internal open cells of a three-dimensional continuous network constructed by the ethylene-propylene copolymer. Preferably the three-dimensional continuous network is constructed by a permissible smallest amount of the copolymer. Provided that X is the amount of the copolymer of which the three-dimensional continuous network is constructed and Y is the amount of the low molecular weight material, the weight fraction of the copolymer represented by $X/(X+Y) \times 100\%$ is preferably up to 30%, more preferably 7 to 25%.

The polymeric reticulated structure (A-1) of the invention is prepared by mixing predetermined amounts of the ethylene-propylene copolymer and the low molecular weight material and an optional component under sufficient conditions to allow the copolymer to form a three-dimensional continuous network.

More particularly, it is recommended to mix the components in a high speed agitator such as a high shearing mixer at an agitation rate of at least 300 rpm, preferably at least 500 rpm, more preferably at least 1,000 rpm. If the components are not agitated at high speed, for example, if they are agitated at a slow speed, for example, in a roll mill, rotor mixer, or cylinder mixer, it is difficult to produce a uniform three-dimensional continuous network structure of the ethylene-propylene copolymer. The mixing temperature is preferably about 100° to 250° C., more preferably about 150° to 200° C. and the mixing time is preferably about 1 to 120 minutes, more preferably about 2 to 90 minutes.

At the end of mixing, the mixture can be crosslinked by mixing vulcanizing agents such as sulfur and organic peroxides or by exposing to electron radiation.

Polymeric Reticulated Structure (B-1)

A second embodiment of the invention relates to a polymeric reticulated structure wherein a three-dimensional continuous reticulated skeleton or network having internal open cells is constructed by a thermoplastic block copolymer terminated with a crystalline ethylene block.

The thermoplastic block copolymer should have a crystalline ethylene block at either one end or both ends. Absent the crystalline ethylene block at a terminal end, the copolymer does not form a three-dimensional network structure or sustain its shape, failing to achieve the object of the invention. The remainder of the copolymer other than the crystalline ethylene block is desirably an amorphous polymer, especially an amorphous ethylene-butylene copolymer, or a copolymer of an amorphous ethylene-butylene and an amorphous styrene. The thermoplastic block copolymer preferably has a degree of polymerization corresponding to a number average molecular weight of about 5,000 to 700,000, preferably 80,000 to 500,000.

Preferably the thermoplastic block copolymer contains 5 to 70% by weight, more preferably 7 to 65% by weight, most preferably 10 to 60% by weight of the crystalline ethylene block. The melting point (Tm) of a crystalline ethylene block representing a block parameter of ethylene is preferably at least 40° C., more preferably at least 60° C., most preferably at least 70° C. as measured by differential scanning calorimetry (DSC).

The thermoplastic block copolymer having such properties is commercially available as Dynalon E6100P and E4600P from Nihon Synthetic Rubber K.K.

It is useful in some applications that the thermoplastic block copolymer is modified to alter its properties by introducing a hydrophilic group such as hydroxyl or a lipophilic group such as nitro therein.

In the practice of the invention, another polymer may be blended with the thermoplastic block copolymer defined just above. Examples of the other polymer include block copolymers of polyethylene and an ethylene-styrene random copolymer which are obtained by hydrogensting a block copolymer of polybutadiene and a butadiene-styrene random copolymer; block copolymers of polybutadiene and polystyrene; and block copolymers of polyethylene and polystyrene which are obtained by hydrogenating a block copolymer of polybutadiene and polystyrene. Such other polymer is used in an amount of 10 to 90% by weight, preferably 20 to 80% by weight based on the thermoplastic block copolymer.

The three-dimensional continuous network constructed by the thermoplastic block copolymer has a microscopic structure as shown in FIG. 1. The three-dimensional continuous network has strands 1 of the copolymer connected to define internal cells 2 which communicate with each other. A low molecular weight material to be described later is trapped in the internal open cells 2. The strands 1 have an average diameter d of up to 10 μm, preferably 1 to 7 μm and the cells 2 have an average diameter D of up to 80 μm, preferably 2 to 50 μm.

The low molecular weight material which is trapped or retained in the internal open cells 2 may be selected from various materials which are either solid or liquid, depending on a particular application. Examples are as described for structure (A-1).

The polymeric reticulated structure (B-1) of the invention has the low molecular weight material trapped in internal open cells of a three-dimensional continuous network constructed by the thermoplastic block copolymer. Preferably the three-dimensional continuous network is constructed by a permissible smallest amount of the thermoplastic block copolymer. Provided that X is the amount of the thermoplastic block copolymer of which the three-dimensional continuous network is constructed and Y is the amount of the low molecular weight material, the weight fraction of the copolymer represented by X/(X+Y)×100% is preferably 5 to 30%, more preferably 7 to 25%.

The polymeric reticulated structure (B-1) of the invention is prepared by mixing predetermined amounts of the thermoplastic block copolymer and the low molecular weight material and an optional component under sufficient conditions to allow the thermoplastic block copolymer to form a three-dimensional continuous network.

More particularly, it is recommended to mix the components in a high speed agitator such as a high shearing mixer at an agitation rate of at least 300 rpm, preferably at least 500 rpm, more preferably at least 1,000 rpm. If the components are not agitated at high speed, for example, if they are agitated at a slow speed, for example, in a roll mill, rotor mixer, or cylinder mixer, it is difficult to produce a uniform three-dimensional continuous network structure of the ethylene-propylene copolymer. The mixing temperature is preferably about 90° to 200° C., more preferably about 100° to 180° C. and the mixing time is preferably about 5 to 120 minutes, more preferably about 10 to 90 minutes.

The thus obtained polymeric reticulated structure (A-1) or (B-1) of the invention is a structure wherein the low molecular weight material is trapped or retained within the fine cellular three-dimensional continuous network whereby a modulus of elasticity can be controlled to a very low range. Then the polymeric reticulated structure (A-1) or (B-1) of the invention can offer commodities covering a wide variety of industrial fields including electric appliances, sports goods, industrial machines, precision machines, transportation vehicles, building, construction, medical and leisure areas. For example, in vibration damping or insulating material and bumper areas, use may be made as sealing members, securing members such as packing, gaskets and grommets, support members such as mounts, holders, and insulators, and damping members such as stops, cushions and bumpers. In shock absorbing areas, use may be made as sports goods such as gloves, mitts, golf clubs, and tennis rackets, shoe insoles, toys, audio equipment, electronic and electric equipment, beds (especially beds for medical, hairdressing, aesthetic and athletic uses), seasts (e.g., auto and theater seats), and vehicle parts.

The polymeric reticulated structure (A-1) or (B-1) of the invention is also applicable to medical equipment as artificial feet, artificial hands, robots, cardiographic electrodes, and low-frequency treatment machine electrodes. As ultra-low hardness rubber, it may be used to form vibration-proof or vibration damping rubber for business machines, and racing tires. As low hardness plastic, it may be used to form molding materials. Further, since release of the low molecular weight material is controllable, it may be used as various sustained release materials utilizing timed release property, such as fragrant preparations, medical preparations, and functional material. It is also suitable for use in various feed rolls including paper feed rubber rolls for feeding sheets of paper or the like as used in business machines such as copying machines, printers, automated teller machines, bill exchange machines, counters, automatic vending machines, and cash dispensers.

Since the low molecular weight material is trapped or retained within the fine cellular three-dimensional continuous network, that is, the low molecular weight material is incorporated in the porous material, the polymeric reticulated structure (A-1) or (B-1) of the invention can be used as cushioning material by itself or in an application utilizing the leaching-out of the low molecular weight material therefrom.

Polymeric Reticulated Structure in the Form of Microporous Body (A-2) and (B-2)

The microporous body (A-2) of the invention has a three-dimensional continuous network or reticulated skeleton structure of an ethylene-propylene copolymer defining internal open cells. It is obtained by removing the low molecular weight material from the polymeric reticulated structure (A-1).

Similarly, the microporous body (B-2) of the invention has a three-dimensional continuous network or reticulated skeleton. structure of a thermoplastic block copolymer defining internal open cells. It is obtained by removing the low molecular weight material from the polymeric reticulated structure (B-1).

By removing the major component or low molecular weight material from the polymeric reticulated structure (A-1) or (B-1), there is left a three-dimensional continuous network which constitutes a microporous body contemplated in this embodiment.

Any desired technique may be used for the removal of the low molecular weight material from the polymeric reticulated structure. For example, the low molecular weight material is dissolved in or extracted with a suitable solvent and the solvent remaining in the structure or network is volatilized and dried. Any desired solvent may be used insofar as the ethylene-propylene copolymer or thermoplastic block copolymer is insoluble or substantially insoluble, but the low molecular weight material and other components are well soluble in the solvent. Exemplary solvents include aromatic hydrocarbons such as xylene, toluene, and benzene, unsaturated aliphatic hydrocarbons such as hexene and pentene, saturated aliphatic hydrocarbons such as hexane and pentane, ketones such as acetone and methyl ethyl ketone, alcohols such as ethanol and butanol, chlorinated aliphatic hydrocarbons such as methylene chloride and chloroform, alicyclic hydrocarbons such as cyclohexanone, ethers such as dioxane and tetrahydrofuran, esters such as butyl acetate, water, alkaline and acidic aqueous solutions, alone or in admixture. Using such a solvent, one or more steps of extraction are carried out.

One illustrative, preferred procedure for effecting dissolution and extraction with a solvent involves finely dividing the polymeric reticulated structure (A-1) or (B-1) filled with the low molecular weight material into small pieces or slicing into thin films, and immersing them in a solvent to extract the low molecular weight material.

In this regard, effective recovery of the low molecular weight material is desirable. If the low molecular weight material is liquid, it is recommended to compress the polymeric reticulated structure (A-1) or (B-1) by means of a roll or press or apply a physical force thereto by means of a suction pump, vacuum pump, centrifugal separator or ultrasonic vibrator for taking out the majority of the low molecular weight material before dissolution and extraction with a solvent is carried out.

The microporous body (A-2) or (B-2) resulting from the extraction step may be subject to post treatment for altering its characteristics. Using ultraviolet radiation, electron radiation or heat, for example, the polymer component can be crosslinked for enhancing thermal stability. By treating with surface active agents or coupling agents, gas etching, plasma treatment or sputtering treatment, the microporous body can be altered in hydrophilic, hydrophobic, electrical, and optical properties as well as strength.

Since the microporous body (A-2) or (B-2) of the invention has a three-dimensional continuous network or reticulated skeleton structure having cells of very small mesh size, it can be used as high functional separation membranes, for example, dialysis membranes, ultrafiltration membranes, reverse osmosis membranes, ion exchange membranes, gas separating membranes, pervaporation membranes, and biosensor membranes. For utilizing both elasticity and porosity, the microporous body can be used as puffs, cosmetic brushes, brush pens, water absorbing rolls, cigarette filters, cleaners, knee, elbow and breast pads, dolls, pleasant touch toys, deodorants, water-impermeable, gas-permeable members, cushions, sheets, vibration damping members, water-keeping members for plants, water-stopping members, sealing members, packing, thermal insulators, vacuum cleaner filters, helmet liners, semiconductor wafer cleaners, shoe insoles and cushions.

Since the microporous body (A-2) or (B-2) has a three-dimensional continuous network or reticulated structure of fine uniform cells, it is highly elastic and resistant to chemicals and heat and will find a wider variety of applications.

Polymeric Reticulated Structure in the Form of Filled Microcellular Composite (A-3) and (B-3)

The filled microcellular composite (A-3) of the invention is a microporous body having a three-dimensional continuous network or reticulated skeleton structure of an ethylene-propylene copolymer which is filled with a normally liquid or solid functional material. It is obtained by infiltrating the microporous body (A-2) with the functional material.

Similarly, the filled microcellular. composite (B-3) of the invention is a microporous body having a three-dimensional continuous network or reticulated skeleton structure of an thermoplastic block copolymer which is filled with a normally liquid or solid functional material. It is obtained by infiltrating the microporous body (B-2) with the functional material.

More particularly, the filled microcellular composite (A-3) or (B-3) of the invention is obtained by removing the low molecular weight material from the polymeric reticulated structure to form a microporous body (A-2) or (B-2) having voids or internal open cells and introducing a normally liquid or solid functional material into the microporous body so that the voids are filled with the functional material.

For introducing the functional material, if the functional material is liquid, the microporous body is impregnated with the functional material liquid optionally diluted with a suitable solvent. If the functional material is solid, it is melted or dissolved in a solvent whereby the microporous body is impregnated with the melt or solution. Also useful is a known method for adsorption of powder in pores.

Some problems arise in causing the functional material to be retained after removal of the low molecular weight material. If the functional material is less compatible with the microporous body (A-2) or (B-2), it is difficult to infiltrate the functional material into the microporous body (A-2) or (B-2) after the solvent used to extract the low molecular weight material is completely removed. In this case, the functional material is contacted with the microporous body (A-2) or (B-2) which is still filled with the solvent, allowing sequential replacement of the solvent by the functional material to take place.

If the functional material is almost incompatible with the microporous body (A-2) or (B-2), for example, one is hydrophilic and the other is hydrophobic or water repellent, then it is necessary to render the microporous body compatible with the functional material. Effective means are by modifying the microporous body on a molecular level, blending the microporous body with a modifier, or surface modifying the three-dimensional continuous network of the microporous body with a coupling agent. It is also effective to mix an amount of surfactant with either one or both of the microporous body and functional material.

If the solvent used to extract the low molecular weight material is less compatible with the functional material, the functional material is dissolved in another solvent. The functional material solution is contacted with the microporous body (A-2) or (B-2) which is filled with the solvent, allowing sequential replacement of the solvents to take place.

If the functional material is a solid or powder which does not melt at a relatively high temperature, it is premixed with another liquid or solid which melts at such a high temperature. The premix is contacted with the microporous body, allowing sequential replacement of the low molecular weight material by the functional material to take place.

The type of functional material is described together with the application of the filled microcellular composite (A-3) or (B-3). The invention is not limited to the following functional material and application.

Normally Liquid Functional Material

Examples of the functional material which is liquid at room temperature include electrolyte solution, plating solution, liquid crystal, magnetic fluid, electrorheological fluid, reactive organic material, etc. By impregnating a microporous body with organic or inorganic electrolyte solution, there is formed a semi-solid electrolyte which will find use in paper cells and electrochromic devices. By impregnating a microporous body with plating solution, there is formed a impregnated body which is interposed between a plating member and a member to be plated to carry out dry plating. By impregnating a microporous body with liquid crystal, there is formed a dimming element which will find use in liquid crystal displays and variable transmission blinds. In the case of magnetic fluid, the impregnated microcellular composite will find use as flexible magnets and clean seals. In the case of electrotheological fluid, the impregnated microcellular composite will find use as vibration damping devices. In the case of reactive organic materials, microporous bodies are separately impregnated with mutually reactive organic materials, and the impregnated bodies are placed in close contact whereupon the organic materials react with each other to form a reaction product which is reinforced by the three-dimensional continuous network of ethylene-propylene copolymer or thermoplastic block copolymer. This is applicable to reactive two-part adhesive for dry adhesion and reactive two-part paint. Using a dye as the functional material, a printing member can be prepared. More particularly, a dye is blended with a softener, plasticizer, tackifier, oligomer or lubricant to form an ink composition with which a microporous body is impregnated.

Other useful functional materials are latex, emulsion, bitumen, clay, natural starch, saccharides, inorganic silicone oil, and phosphazenes. Also included are animal oils such as beef tallow, lard, horse tallow, chicken oil, and fish oil; honey, fruit juice, chocolate, dairy products such as yogurt; organic solvents such as hydrocarbon, halogenated hydrocarbon, alcohol, phenol, ether, acetal, ketone, fatty acid, ester, nitrogen compound and sulfur compound solvents; various pharmaceutical components, soil modifiers, fertilizers, petroleum, water, and aqueous solutions.

Where pharmaceutical components are used as the functional material, for example, there are obtained pharmaceutical external preparations, typically fomentation. Any of pharmaceutical components which are dermatologic may be used. In the case of a medicament intended for local action, the filled microcellular composite allows the medicament to penetrate deeply. In the case of a medicament intended for systemic action, the filled microcellular composite allows the medicament to transfer into blood. The pharmaceutical components may have a molecular weight of less than 1,000, preferably less than 700, more preferably less than 500.

Further typical functional materials are fragrant components. Improved fragrance preparations are obtained. Exemplary fragrant components are natural flavors such as lemon oil, lime oil, spearmint oil, jasmine oil, orange oil pine oil, menthol oil, eucalyptus oil, lavender oil, and musk oil; and synthetic flavors derived therefrom, such limonene, eugenol, citronellol, vanillin, carvone, ionc muscone, rose oxide, indole, geranyl acetate, and ethyl benzoate. They may be used alone or in admixture.

Normally Solid Functional Material

The functional materials which are solid at room temperature include polymers, for example, conductive polymers such as polyaniline, polypyrrole, and polyacetylene, photoconductive polymers such as phthalocyanine derivatives, and water absorbing polymers such as chitin, chitosan, acrylic acid polymers and polyvinyl alcohol (PVA). Also useful are ceramic materials such as barium titanate and zinc zirconate having piezoelectric properties, and titanium oxide having light absorbing properties, metals having conductive or magnetic properties, and carbon and other powders having conductive, gas adsorbing or deodorant properties. Where ordinary thermoplastic or thermosetting polymers or organic materials are used as the functional material, there are obtained composite materials in which the thermoplastic or thermosetting resins are improved in impact resistance, strength and elongation.

The filled microcellular composites (A-3) and (B-3) of the invention effectively retain the functional material which is liquid or solid at room temperature and allow the functional material to be slowly released over a long time, thus finding a variety of applications.

EXAMPLE

Examples of the present invention are given below by way of illustration and not by way of limitation.

Examples 1–7 & Comparative Example 1

The ethylene-propylene copolymers (EPR) used herein had an ethylene content, crystallinity, polyethylene section melting point (Tm), and number average molecular weight (Mn) as shown in Table 1. The type of low molecular weight (LMW) material is also shown in Table 1. Polymeric reticulated structures were prepared by mixing an ethylene-propylene copolymer with a low molecular weight material in a mixing ratio as shown in Table 1 and agitating them in a high shearing mixer under conditions as shown in Table 1.

For the resulting polymeric reticulated structures, the average diameter (d) of strands and average diameter (D) of cells were determined. The results are also shown in Table 1.

TABLE 1

|  | E1 | E2 | E3 | E4 | E5 | E6 | E7 | CE1 |
|---|---|---|---|---|---|---|---|---|
| EPR | | | | | | | | |
| Ethylene content, wt % | 78 | 78 | 78 | 72 | 74 | 78 | 78 | 50 |
| Crystallinity, % | 12 | 12 | 12 | 14 | 5 | 12 | 12 | ≈0 |
| Tm, °C. | 48 | 48 | 48 | 54 | 47 | 48 | 48 | — |
| Mn | 200,000 | 200,000 | 200,000 | 250,000 | 250,000 | 270,000 | 270,000 | 200,000 |
| LMW material* | DIDA | DIDA | DIDA | PB | DIDA | DOP | DOA | DIDA |
| EPR mix ratio, wt % | 11 | 15 | 20 | 20 | 20 | 20 | 15 | 20 |
| Agitation conditions | | | | | | | | |
| Temperature, °C. | 180 | 180 | 180 | 160 | 180 | 180 | 180 | 180 |
| Revolution, rpm | 3000 | 3000 | 3000 | 2000 | 2000 | 1500 | 3000 | 2000 |
| Time, min. | 60 | 60 | 60 | 60 | 60 | 60 | 60 | 60 |
| Strand d, μm | 1–2 | 1–2 | 1–2 | 1–2 | 1–2 | 1–2 | 1–2 | — |
| Cell D, μm | 10–20 | 15 | 10 | 5–10 | 10 | 15 | 10 | — |

*DIDA: diisodecyl adipate
PB: polybutene, molecular weight 300
DOP: di-2-ethylhexyl phthalate
DOA: di-2-ethylhexyl adipate

Examples 8–10 & Comparative Example 2

The ethylene-propylene copolymers (EPR) used herein had an ethylene content, crystallinity, polyethylene section melting point (Tm), and number average molecular weight (Mn) as shown in Table 2. The low molecular weight (LMW) material used herein was diisodecyl adipate (DIDA). Polymeric reticulated structures were prepared by mixing an ethylene-propylene copolymer with a low molecular weight material in a mixing ratio as shown in Table 2 and agitating them in a high shearing mixer under conditions as shown in Table 2.

For the resulting polymeric reticulated structures, the average diameter (d) of strands and average diameter (D) of cells were determined. The results are also shown in Table 2.

Using a solvent as shown in Table 2, the low molecular weight material was dissolved and extracted from the structure. For the resulting microporous bodies, the average diameter (d) of strands and average diameter (D) of cells were determined. The results are also shown in Table 2.

TABLE 2

|  | E8 | E9 | E10 | CE2 |
|---|---|---|---|---|
| Polymeric reticulated structure | | | | |
| EPR | | | | |
| Ethylene content, wt % | 78 | 78 | 78 | 50 |
| Crystallinity, % | 12 | 12 | 12 | ≈0 |
| Tm, °C. | 48 | 48 | 48 | — |
| Mn | 250,000 | 250,000 | 250,000 | 250,000 |
| LMW material | DIDA | DIDA | DIDA | DIDA |
| EPR mix ratio, wt % | 10 | 16 | 21 | 20 |
| Agitation conditions | | | | |
| Temperature, °C. | 180 | 180 | 180 | 180 |
| Revolution, rpm | 3000 | 3000 | 3000 | 3000 |
| Strand d, μm | 1–2 | 1–2 | 1–2 | — |
| Cell D, μm | 10–20 | 10–20 | 10–20 | — |
| Microporous body | | | | |
| Solvent | acetone | methanol | acetone | — |
| Strand d, μm | 1–2 | 1–2 | 1–2 | not gelled |
| Cell D, μm | 10–20 | 10–20 | 10–20 | — |

Example 11

The ethylene-propylene copolymer (EPR) used herein had an ethylene content, crystallinity, polyethylene section melting point (Tm), and number average molecular weight (Mn) as shown in Table 3. The low molecular weight (LMW) material used herein was diisodecyl adipate (DIDA). A polymeric reticulated structure was prepared by mixing 10% by weight of the ethylene-propylene copolymer with 90% by weight of DIDA and agitating them in a high shearing mixer under conditions as shown in Table 3.

For the resulting polymeric reticulated structure, the average diameter (d) of strands and average diameter (D) of cells were determined. The results are also shown in Table 3.

Using acetone, the low molecular weight material (DIDA) was dissolved and extracted from the structure. For the resulting microporous body, the average diameter (d) of strands and average diameter (D) of cells were determined. The results are also shown in Table 3.

TABLE 3

|  | E11 |
|---|---|
| Polymeric reticulated structure | |
| EPR | |
| Ethylene content, wt % | 78 |
| Crystallinity, % | 12 |
| Tm, °C. | 48 |
| Mn | 250,000 |
| LMW material | DIDA |
| EPR mix ratio, wt % | 10 |
| Agitation conditions | |
| Temperature, °C. | 180 |
| Revolution, rpm | 3000 |
| Strand d, μm | 1–2 |
| Cell D, μm | 10–20 |
| Microporous body | |
| Solvent | acetone |
| Strand d, μm | 1–2 |
| Cell D, μm | 10–20 |

The microporous body was impregnated with a liquid functional material, obtaining a filled microcellular composite. The liquids used herein were:

an ink consisting of 82 vol % of water, 12 vol % of diethylene glycol and 8 vol % of dye, an electrolyte solution containing 3.0 mol of LiBF$_4$ in 1 liter of propylene carbonate, a plating solution containing 80 g of CuSO$_4$·5H$_2$O and 180 g of H$_2$SO$_4$ in 1 liter of water, and an epoxy adhesive.

TABLE 4

| Functional material | Functional material/ microporous body (volume ratio) |
| --- | --- |
| Ink | 0.85 |
| Electrolyte solution | 0.80 |
| Plating solution | 0.81 |
| Epoxy adhesive | 0.80 |

Examples 12–15

The thermoplastic block copolymers used herein had a number average molecular weight (Mn), molecular structure, crystalline ethylene content, and crystalline ethylene block melting point (Tm) as shown in Table 5. The type of low molecular weight (LMW) material is also shown in Table 5. Polymeric reticulated structures were prepared by mixing a thermoplastic block copolymer with a low molecular weight material in a mixing ratio as shown in Table 5 and agitating them in a high shearing mixer under conditions as shown in Table 5.

For the resulting polymeric reticulated structures, the average diameter (d) of strands and average diameter (D) of cells were determined. The results are also shown in Table 5.

TABLE 5

| | E12 | E13 | E14 | E15 |
| --- | --- | --- | --- | --- |
| Block copolymer | | | | |
| Mn | 1.5 × 10$^5$ | 1.5 × 10$^5$ | 2.8 × 10$^5$ | 2.8 × 10$^5$ |
| Molecular structure* | A | A | B | B |
| Cryst. ethylene cont., wt % | 15 | 15 | 30 | 30 |
| Tm, °C. | 100 | 100 | 100 | 100 |
| LMW material** | (1) | (2) | (1) | (3) |
| Copolymer mix ratio, wt % | 15 | 15 | 12 | 15 |
| Agitation conditions | | | | |
| Temperature, °C. | 180 | 180 | 180 | 180 |
| Revolution, rpm | 3500 | 3500 | 3500 | 3500 |
| Time, min. | 60 | 60 | 60 | 60 |
| Strand d, μm | 2–3 | 2–3 | 3–5 | 3–5 |
| Cell D, μm | 20 | 15 | 20 | 20 |

*Molecular structure
A: thermoplastic block copolymer in the form of a block copolymer of an amorphous ethylene-butylene and an amorphous styrene having a crystalline ethylene block attached at one end
B: thermoplastic block copolymer in the form of an amorphous ethylene-butylene copolymer having a crystalline ethylene block attached at both ends
**Low molecular weight material
(1) polyisobutylene
(2) paraffin oil
(3) naphthene oil Examples 16–18

The thermoplastic block copolymers used herein had a number average molecular weight (Mn), molecular structure, crystalline ethylene content, and crystalline ethylene block melting point (Tm) as shown in Table 6. The type of low molecular weight (LMW) material is also shown in Table 6. Polymeric reticulated structures were prepared by mixing a thermoplastic block copolymer with a low molecular weight material in a mixing ratio as shown in Table 6 and agitating them in a high shearing mixer under conditions as shown in Table 6.

For the resulting polymeric reticulated structures, the average diameter (d) of strands and average diameter (D) of cells were determined. The results are also shown in Table 6.

Using a solvent as shown in Table 6, the low molecular weight material was dissolved and extracted from the structure. For the resulting microporous bodies, the average diameter (d) of strands and average diameter (D) of cells were determined. The results are also shown in Table 6.

TABLE 6

| | E16 | E17 | E18 |
| --- | --- | --- | --- |
| Polymeric reticulated structure | | | |
| Block copolymer | | | |
| Mn | 1.5 × 10$^5$ | 1.5 × 10$^5$ | 2.8 × 10$^5$ |
| Molecular structure* | A | A | B |
| Cryst. ethylene cont., wt % | 15 | 15 | 30 |
| Tm, °C. | 100 | 100 | 100 |
| LMW material** | (1) | (2) | (1) |
| Copolymer mix ratio, wt % | 15 | 15 | 12 |
| Agitation conditions | | | |
| Temperature, °C. | 180 | 180 | 180 |
| Revolution, rpm | 3000 | 3000 | 3000 |
| Strand d, μm | 2–3 | 2–3 | 3–5 |
| Cell D, μm | 20 | 15 | 20 |
| Microporous body | | | |
| Solvent | acetone | hexane | acetone |
| Strand d, μm | 2–3 | 2–3 | 3–5 |
| Cell D, μm | 20 | 15 | 20 |

*Molecular structure
A: thermoplastic block copolymer in the form of a copolymer of an amorphous ethylene-butylene and an amorphous styrene having a crystalline ethylene block attached at one end
B: thermoplastic block copolymer in the form of an amorphous ethylene-butylene copolymer having a crystalline ethylene block attached at both ends
**Low molecular weight material
(1) polyisobutylene
(2) paraffin oil Examples 19 and 20

The thermoplastic block copolymer used herein had a number average molecular weight (Mn), molecular structure,. crystalline ethylene content, and crystalline ethylene block melting point (Tm) as shown in Table 7. The low molecular weight (LMW) material was polyisobutylene. A polymeric reticulated structure was prepared by mixing 10% by weight of the thermoplastic block copolymer with 90% by weight of polyisobutylene and agitating them in a high shearing mixer under conditions as shown in Table 7.

For the resulting polymeric reticulated structure, the average diameter (d) of strands and average diameter (D) of cells were determined. The results are also shown in Table 7.

Using acetone, the low molecular weight material was dissolved and extracted from the structure. For the resulting microporous bodies, the average diameter (d) of strands and average diameter (D) of cells were determined. The results are also shown in Table 7.

TABLE 7

|  | E19 | E20 |
|---|---|---|
| Polymeric reticulated structure Block copolymer | | |
| Mn | $1.5 \times 10^5$ | $4.5 \times 10^5$ |
| Molecular structure | A | B |
| Cryst. ethylene cont., wt % | 15 | 30 |
| Tm, °C. | 100 | 100 |
| LMW material | polyisobutylene | polyisobutylene |
| Copolymer mix ratio, wt % | 15 | 10 |
| Agitation conditions | | |
| Temperature, °C. | 180 | 140 |
| Revolution, rpm | 3000 | 3000 |
| Strand d, μm | 2–3 | 3–5 |
| Cell D, μm | 20 | 20 |
| Microporous body | | |
| Solvent | acetone | acetone |
| Strand d, μm | 2–3 | 3–5 |
| Cell D, μm | 20 | 20 |

A: thermoplastic block copolymer in the form of a copolymer of an amorphous ethylene-butylene and an amorphous styrene having a crystalline ethylene block attached at one end
B: thermoplastic block copolymer in the form of an amorphous ethylene-butylene copolymer having a crystalline ethylene block attached at both ends The microporous body was impregnated with a liquid functional material, obtaining a filled microcellular composite. The liquids used herein were:

an ink consisting of 82 vol % of water, 12 vol % of diethylene glycol and 8 vol % of dye, an electrolyte solution containing 3.0 mol of $LiBF_4$ in 1 liter of propylene carbonate, a plating solution containing 80 g of $CuSO_4.5H_2O$ and 180 g of $H_2SO_4$ in 1 liter of water, and a two-part curing epoxy adhesive.

TABLE 8

| Functional material | Functional material/ microporous body (volume ratio) |
|---|---|
| Ink | 90/10 |
| Electrolyte solution | 90/10 |
| Plating solution | 90/10 |
| Epoxy adhesive | 90/10 |

Japanese Patent Application Nos. 232320/1994, 232321/1994, 232322/1994, 239614/1994, 239615/1994, and 239616/1994 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A polymeric reticulated structure which is prepared by mixing a copolymer consisting essentially of ethylene and propylene and having an ethylene content of at least 60% by weight with a low molecular weight material whereby the low molecular weight material is trapped in the three-dimensional continuous network the copolymer forms.

2. A method for preparing a polymeric reticulated structure as set forth in claim 1, comprising the step of mixing a copolymer consisting essentially of ethylene and propylene and having an ethylene content of at least 60% by weight with a low molecular weight material such that the resulting mixture contains up to 30% by weight of the copolymer.

3. A polymeric reticulated structure which is prepared by mixing a copolymer consisting essentially of ethylene and propylene and having an ethylene content of at least 60% by weight with a low molecular weight material and removing the low molecular weight material from the mixture whereby the structure has a three-dimensional continuous network composed of strands and cells, the strands having an average diameter of up to 8 μm and the cells having an average diameter of up to 80 μm.

4. A method for preparing a polymeric reticulated structure as set forth in claim 3, comprising the steps of:

mixing a copolymer consisting essentially of ethylene and propylene and having an ethylene content of at least 60% by weight with a low molecular weight material such that the resulting mixture contains up to 30% by weight of the copolymer, thereby forming a reticulated structure wherein the copolymer forms a three-dimensional continuous network in which the low molecular weight material is trapped, and removing the low molecular weight material from the reticulated structure.

5. A polymeric reticulated structure which is prepared by a method comprising the steps of:

mixing a copolymer consisting essentially of ethylene and propylene and having an ethylene content of at least 60% by weight with a low molecular weight material, removing the low molecular weight material from the mixture, thereby forming a microporous body having a three-dimensional continuous network composed of strands and cells, the strands having an average diameter of up to 8 μm and the cells having an average diameter of up to 80 μm, and incorporating a functional material which is liquid or solid at room temperature into the microporous body.

6. A method for preparing a polymeric reticulated structure as set forth in claim 5, comprising the steps of:

mixing a copolymer consisting essentially of ethylene and propylene and having an ethylene content of at least 60% by weight with a low molecular weight material such that the resulting mixture contains up to 30% by weight of the copolymer, thereby forming a reticulated structure wherein the copolymer forms a three-dimensional continuous network in which the low molecular weight material is trapped, removing the low molecular weight material from the reticulated structure to leave voids, and infiltrating a functional material which is liquid or solid at room temperature into the voids.

7. A polymeric reticulated structure which is prepared by mixing a thermoplastic block copolymer having a crystalline ethylene block attached to one end or both ends of an amorphous ethylene-butylene copolymer with a low molecular weight material whereby the low molecular weight material is trapped in the three-dimensional continuous network the block copolymer forms.

8. The polymeric reticulated structure of claim 7 wherein said thermoplastic block copolymer contains 5 to 70% by weight of the crystalline ethylene block which has a melting point of at least 40° C.

9. A method for preparing a polymeric reticulated structure as set forth in claim 7, comprising the step of mixing a thermoplastic block copolymer having a crystalline ethylene block attached at one end or both ends of an amorphous ethylene-butylene copolymer with a low molecular material such that the resulting mixture contains 5 to 30% by weight of the thermoplastic block copolymer.

10. A polymeric reticulated structure which is prepared by mixing a thermoplastic block copolymer having a crystalline ethylene block attached to one end or both ends of an amorphous ethylene-butylene copolymer with a low molecular weight material and removing the low molecular weight material from the mixture whereby the structure has a three-dimensional continuous network composed of strands and cells, the strands having an average diameter of up to 10 µm and the cells having an average diameter of up to 80 µm.

11. The polymeric reticulated structure of claim 10 wherein said thermoplastic block copolymer contains 5 to 70% by weight of the crystalline ethylene block which has a melting point of at least 40° C.

12. A method for preparing a polymeric reticulated structure as set forth in claim 10, comprising the steps of:

mixing a thermoplastic block copolymer having a crystalline ethylene block attached to one end or both ends of an amorphous ethylene-butylene copolymer with a low molecular weight material such that the resulting mixture contains 5 to 30% by weight of the thermoplastic block copolymer, thereby forming a reticulated structure wherein the copolymer forms a three-dimensional continuous network in which the low molecular weight is trapped, and removing the low molecular weight material from the reticulated structure.

13. A polymeric reticulated structure which is prepared by a method comprising the steps of:

mixing a thermoplastic block copolymer having a crystalline ethylene block attached to one end or both ends of an amorphous ethylene-butylene copolymer with a low molecular weight material, removing the low molecular weight material from the mixture, thereby forming a microporous body having a three-dimensional continuous network composed of strands and cells, the strands having an average diameter of up to 10 µm, and the cells having an average diameter of up to 80 µmm, and incorporating a functional material which is liquid or solid at room temperature into the microporous body.

14. The polymeric reticulated structure of claim 13 wherein said thermoplastic block copolymer contains 5 to 70% by weight of the crystalline ethylene block which has a melting point of at least 40° C.

15. A method for preparing a polymeric reticulated structure as set forth in claim 13, comprising the steps of:

mixing a thermoplastic block copolymer having a crystalline ethylene block attached to one end or both ends of an amorphous ethylene-butylene copolymer with a low molecular weight material such that the resulting mixture contains 5 to 30% by weight of the copolymer, thereby forming a reticulated structure wherein the copolymer forms a three-dimensional continuous network in which the low molecular weight material is trapped, removing the low molecular weight material from the reticulated structure to leave voids, and infiltrating a functional material which is liquid or solid at room temperature into the voids.

* * * * *